3,049,434
LAUNDRY STARCH AND PROCESS
John R. Harrison, Harbor Beach, Mich., assignor to Hercules Powder Company, Wilmington, Del., a corporation of Delaware
No Drawing. Filed May 29, 1959, Ser. No. 816,689
18 Claims. (Cl. 106—194)

The present invention relates to an improved cold water-dispersible laundry starch, and also to a process of making same, which disperses rapidly in cold water with substantially no lumping and which has excellent sizing characteristics.

The term borates is used herein for simplicity to mean salts of boric acid. The term hydrophilic colloid is used herein in its usual sense and, therefore, when applied to starches it is restricted to gelatinized starches. The laundry "sours" used was 70% sodium acid fluoride, 30% sodium silicofluoride, as conventionally used in the laundry art.

It is known, e.g. in the adhesive art, to use a mixture of a hydrophilic colloid (specifically a gelatinized starch) and an ungelatinized cereal starch, the former serving as a carrier for the latter. It is also known to use boric acid and salts thereof in admixture with various starches. However, the prior art practices have not been as satisfactory as desired. In fact, a serious problem has been that of lumping when attempting to dissolve or disperse the product in cold water before using, particularly as an instant laundry starch, i.e. a laundry starch which requires no cooking before use. Insofar as I am aware, however, no one has used nor does the art suggest using the constituents of my composition in the manner I use them to produce my improved starch product.

I have found in accordance with the present invention that I can make a starch composition having a very high rate of dispersion in cold water with substantially no lumping and giving excellent sizing characteristics by carrying out the process which comprises making a cold water-dispersible laundry starch by adding a salt of boric acid to a mixture of ungelatinized cereal starch and an inert liquid diluent, drying the resulting mixture without gelatinizing said starch, dry blending with the resulting dry material a water-soluble hydrophilic colloid.

It is absolutely necessary that the borate be in the mixture of the ungelatinized cereal starch and diluent when the mixture is dried. It is equally necessary that drying of the mixture in the presence of borate be done without gelatinizing the starch. I have unsuccessfully tried (1) to add the borate to dried ungelatinized cereal starch and mix this with a hydrophilic colloid, (2) to mix ungelatinized cereal starch, hydrophilic colloid, borate and water and then dry the resulting mixture, (3) to dry an aqueous suspension of ungelatinized cereal starch in the presence of borate under conditions (e.g. roll dry) which gelatinizes the cereal starch and then mixing the resulting gelatinized cereal starch with a hydrophilic colloid. In cases 1, 2 and 3 above, lumping was always very bad when attempting to disperse the product in cold water for use as a laundry size and the sizing characteristics also were unsatisfactory; the same was true when I attempted to substitute boric acid for borate in cases 1, 2 and 3 above and also for the borate in accordance with my present invention.

The following examples illustrate specific embodiments of my invention. In these examples the starch compositions were prepared as follows: Ungelatinized wheat starch in the form of an aqueous slurry at about 20° Baumé (3.4 pounds starch/gallon of water) was used as it came from the plant. The borate was added to and mixed with this slurry. The resulting slurry was spray dried to a moisture content of about 3% to 15% at a temperature of about 170° C. in a spray dryer. This dried material was dry blended with the hydrophilic colloid in a mixer and the Nopco KRV oil was spray dried onto the dry blended material while continuing to mix to give the final starch product.

The dispersion test was made by adding 18 grams of the above final starch product to 280 ml. tap water at room temperature and mixing with a wooden paddle.

The suspension test, which is a measure of the suspending power of the hydrophilic colloid, was made as follows: To 280 ml. tap water at room temperature in a milk shake mixer cup was added 18 grams of the hydrophilic colloid with the mixer running. Mixing was contined for twenty seconds. The suspension was transferred to a 250 ml. graduated cylinder, allowed to stand for two hours and then the volume of the solids phase estimated.

The hand ironing test was made by taking 50 ml. of the above suspension (18 grams starch product in 280 ml. of water) and diluting with 150 ml. tap water at room temperature, dipping the cloths into the final starch solution, wringing out by hand, and then ironing.

In the examples and elsewhere herein all percentages are by weight. Percent hydrophilic colloid, percent ungelatinized cereal starch, and percent sours are based on the combined weight of hydrophilic colloid and ungelatinized cereal starch. Percent borate is based on the weight of ungelatinized cereal starch. All examples contained 2% Nopco KRV oil as a lubricant. The use of a lubricant is not necessary and is not a part of the present invention. "Nopco KRV oil" is an aqueous emulsion of sulfonated palmitic acid containing a refined petroleum hydrocarbon as an emulsion stabilizer. Various lubricants have been well known for a number of years in the art to which this invention relates. They are sometimes referred to as ironing aids. As is well known, the purpose of a laundry lubricant is to eliminate any tendency which the clothes may have to stick to the iron when ironed. Sulfonated fatty acids and waxes have been rather widely used as laundry lubricants. Somewhat related materials are disclosed in U.S. Patent 2,645,584 as laundry lubricants.

*Table 1*

| Ex. No. | Hydrophilic colloid, percent | Ungelatinized cereal starch, percent | Borate, percent (borax was used) | Sours, percent | Dispersion test, 18 gm./280 ml. | Suspension test, ml. solids | Solution, pH | Ironed cloth [1] stiffness commercially acceptable | Ironed cloth [1] color |
|---|---|---|---|---|---|---|---|---|---|
| 1 | 20 gelatinized potato starch | 80 wheat starch | None | No | Lumped badly | 150 | 6.4 | Yes | White. |
| 2 | do | do | 5 | No | No lumping | 242 | 8.7 | Yes | Do. |
| 3 | do | do | 5 | No | do | 136 | 5.5 | Yes | Do. |
| 4 | 8 C high CMC | 92 wheat starch | 10 | No | do | | | Yes | Do. |
| 5 | do | do | 5 | No | do | 150 | | Yes | Do. |
| 6 | 3 S high CMC | 97 wheat starch | 5 | No | do | 150 | | Yes | Do. |
| 7 | do | do | 10 | No | do | 250 | | Yes | Do. |
| 8 | 3 Driscose [2] CMC | do | 5 | No | do | | | Yes | Do. |

See footnotes at end of table.

Table 1—Continued

| Ex. No. | Hydrophilic colloid, percent | Ungelatinized cereal starch, percent | Borate, percent (borax was used) | Sours, percent | Dispersion test, 18 gm./280 ml. | Suspension test, ml. solids | Solution, pH | Ironed cloth[1] stiffness commercially acceptable | Ironed cloth[1] color |
|---|---|---|---|---|---|---|---|---|---|
| 9 | 96.8 RDWS, 3.2 C high CMC | None | 10 | No | | | | | |
| 10 | 20 of the mixed hydrophilic colloid in Ex. 9 | 80 wheat starch | 2.5 | No | | | | | |
| 11 | 10 HES[3] | 90 wheat starch | 5 | 2 | No lumping | 108 | | Yes | Do. |
| 12 | 20 HES | 80 wheat starch | 5 | 2 | ----do | 92 | 6.9 | Yes | Do. |
| 13 | 20 HPS[4] | ----do | 5 | 2 | ----do | 102 | 7.9 | Yes | Do. |
| 14 | 20 gelatinized potato starch | ----do | [5]5 | No | Lumped badly | 154 | 6.7 | Yes | Do. |

[1] In Ex. 1–3, the cloth stiffness and color tests were carried out in a commercial laundry, using a starch concentration of 45 gm./1,500 ml. solution (4 oz./gal.).
[2] RDWS is roll-dried wheat starch.
[3] HES is hydroxyethyl starch.
[4] HPS is hydroxypropyl starch.
[5] Boric acid.

NOTE.—In Exs. 9 and 10, the ingredients were slurried together 1 hour and then roll dried at 3.5 r.p.m. and 90 p.s.i.g. steam. The dispersions were pasty and, therefore, unsuitable for starching. In Ex. 11, the HES had an M.S. of 0.35 (M.S. is moles of ethylene oxide substituted per anhydroglucose unit the hydroxyethyl starch molecule). In Ex. 12 the HES had an M.S. of 0.1. In Ex. 13 the HPS had an M.S. of 0.2.

The unusual and unexpected feature of this invention is my discovery that lumping is substantially eliminated only if the ungelatinized cereal starch, preferably in the form of an aqueous slurry, is dried in the presence of a borate and under such conditions so as to avoid gelatinizing the cereal starch, and this dried material is in turn incorporated with the hydrophilic colloid. I am not certain of what happens during this drying step, but whatever it may be, this is a very important part of my invention.

Any borate is applicable to my invention. Because of cost and commercial availability I prefer to use borax, i.e. sodium tetraborate having the formula $Na_2B_4O_7 \cdot 10H_2O$. Sodium metaborate and sodium pentaborate are also quite practical and very effective.

Although any amount of borate does some good, in order to realize the improvement to the desired extent, I use at least about 3% and preferably 5%, e.g. of borax. While any amounts of borax above 10% can be used, they do not give any further significant improvement. In fact, there is one disadvantage of using large amounts of borax in that it increases the pH and therefore, requires the use of more sours to bring the pH of the starch in the laundry to the acid side. As is well known in this art, one prefers to starch on the acid side because there is some tendency for yellowing of the cloth to occur if starching is done on the alkaline side.

Although (as disclosed on page 2 of this application) the cereal starch used in the examples was in the form of an aqueous slurry at about 20° Baumé (3.4 pounds starch/gallon of water) as it came from the plant, any mixture of the cereal starch with an inert liquid diluent which permits intimate contact of the borate and the cereal starch prior to drying is applicable in my invention.

As the carrier portion of the starch composition, I may use any hydrophilic colloid soluble in cold water. Gelatinized starch, gelatinized starch ethers, cellulose ethers and natural gums work well. Gelatinized potato starch, gelatinized hydroxyethyl and hydroxypropyl starch, gelatinized carboxymethyl starch and carboxymethyl cellulose are typical examples of hydrophilic colloids which give very good results. Gelatinized hydroxyalkyl starches are the preferred starch ethers. Carboxyalkyl cellulose ethers are the preferred cellulose ethers. Typical examples of natural gums include gum tragacanth, sodium alginate, psylium seed, gum arabic, Irish moss, agar, algin, and the like.

The amount of hydrophilic colloid will depend on the particular one used. With gelatinized potato starch and CMC, best results are obtained using 10%–30% and 3%–10% respectively based on the combined weight of the hydrophilic colloid and ungelatinized starch. Amounts of potato starch or CMC below this do not give as high stiffness as desired, while above these amounts the tendency is greater for the starched clothes to highlight or streak when ironed.

Cereal starches as a class are useful in my invention. Cereal starches include wheat, barley, corn, rice and others. The amounts of cereal starch vary inversely with the amounts of hydrophilic colloid used, i.e. the two add up to 100.

Any type of drying is applicable for drying the aqueous dispersion of ungelatinized cereal starch and borate provided it does not gelatinized the cereal starch. While spray drying has given excellent results, flash drying is also quite satisfactory.

The pH of the aqueous dispersion of cereal starch in the presence of borate is important, e.g. when borax is used the pH must be at least 7 and preferably 8 or above. The maximum pH obtainable with borax is about 9.3, since it buffers at this point. My improved results are not obtained when the pH of this dispersion is below 7.

As mentioned hereinbefore, starching of clothes is done at an acid pH to minimize the tendency of the clothes to yellow when ironed. For this reason, it is conventional practice in the art to add laundry sours during starching with alkaline starches. Upon spray drying my aqueous dispersion of ungelatinized cereal starch in the presence of a borate and then dry mixing the resulting dried material with a hydrophilic colloid, I obtained a final product having an alkaline pH. For this reason, and in view of the above, as a matter of precaution against yellowing in the event that one neglects to add laundry sours during starching, I may add laundry sours to my product, however, this is not necessary. In a typical example according to my invention, my final product has a pH of about 8.5 in the absence of sours. This may be readily reduced to an acid pH by adding about 1.5–2 parts of sodium acid silicofluoride per 100 parts of my starch product.

As many apparent and widely different embodiments of this invention may be made without departing from the spirit and scope thereof, it is to be understood that the invention is not limited to the specific embodiments thereof except as defined in the appended claims.

What I claim and desire to protect by Letters Patent is:

1. Process of making a cold water-dispersible laundry starch which comprises adding a salt of boric acid to a mixture of ungelatinized cereal starch and an inert liquid diluent, drying the resulting mixture without gelatinizing said ungelatinized cereal starch, dry blending with the resulting dry material a water-soluble hydrophilic colloid, the pH of said resulting mixture being at least about 7, the amount of hydrophilic colloid being about 3%–30% based on the combined weight of hydrophilic colloid and ungelatinized cereal starch, the amount of said salt of boric acid being at least about 3% based on the weight of ungelatinized cereal starch.

2. Process of making a cold water-dispersible laundry starch which comprises adding borax to a slurry of ungelatinized wheat starch, drying the resulting slurry without gelatinizing said ungelatinized wheat starch, dry blending with the resulting dry material a water-soluble hydrophilic colloid, the pH of said resulting slurry being at least about 7, the amount of hydrophilic colloid being about 3%–30% based on the combined weight of hydrophilic colloid and ungelatinized wheat starch, the amount of borax being at least about 3% based on the weight of ungelatinized wheat starch.

3. Process of making a cold water-dispersible laundry starch which comprises adding a salt of boric acid to an aqueous slurry of ungelatinized cereal starch, drying the resulting slurry without gelatinizing said ungelatinized cereal starch, dry blending with the resulting dry material gelatinized potato starch, the pH of said resulting slurry being at least about 7, the amount of gelatinized potato starch being about 10%–30% based on the combined weight of gelatinized potato starch and ungelatinized cereal starch, the amount of said salt of boric acid being at least about 3% based on the weight of ungelatinized cereal starch.

4. Process of making a cold water-dispersible laundry starch which comprises adding borax to a slurry of ungelatinized wheat starch, spray drying the resulting slurry without gelatinizing said ungelatinized wheat starch, dry blending with the resulting dry material a water-soluble hydrophilic colloid, the pH of said resulting slurry being at least about 7, the amount of hydrophilic colloid being about 3%–30% based on the combined weight of hydrophilic colloid and ungelatinized wheat starch, the amount of borax being at least about 3% based on the weight of ungelatinized wheat starch.

5. Process of making a cold water-dispersible laundry starch which comprises adding borax to a slurry of ungelatinized wheat starch, spray drying the resulting slurry without gelatinizing said ungelatinized wheat starch, dry blending with the resulting dry material a water-soluble carboxyalkyl cellulose, the pH of said resulting slurry being at least about 7, the amount of carboxyalkyl cellulose being about 3%–10% based on the combined weight of carboxyalkyl cellulose and ungelatinized wheat starch, the amount of borax being at least about 3% based on the weight of ungelatinized wheat starch.

6. Process of making a cold water-dispersible laundry starch which comprises adding borax to a slurry of ungelatinized wheat starch, spray drying the resulting slurry without gelatinizing said ungelatinized wheat starch, dry blending with the resulting dry material a water-soluble carboxymethylcellulose, the pH of said resulting slurry being at least about 7, the amount of carboxymethylcellulose being about 3%–10% based on the combined weight of carboxymethylcellulose and ungelatinized wheat starch, the amount of borax being at least about 3% based on the weight of ungelatinized wheat starch.

7. Process of making a cold water-dispersible laundry starch which comprises adding a salt of boric acid to an aqueous slurry of ungelatinized cereal starch, drying the resulting slurry without gelatinizing said ungelatinized cereal starch, dry blending with the resulting dry material hydroxylalkyl starch, the pH of said resulting slurry being at least about 7, the amount of hydroxyalkyl starch being about 3%–30% based on the combined weight of hydroxyalkyl starch and ungelatinized cereal starch, the amount of said salt of boric acid being at least about 3% based on the weight of ungelatinized cereal starch.

8. Process of making a cold water-dispersible laundry starch which comprises adding a salt of boric acid to an aqueous slurry of ungelatinized cereal starch, drying the resulting slurry without gelatinizing said ungelatinized cereal starch, dry blending with the resulting dry material hydroxypropyl starch, the pH of said resulting slurry being at least about 7, the amount of hydroxypropyl starch being about 3%–30% based on the combined weight of hydroxypropyl starch and ungelatinized cereal starch, the amount of said salt of boric acid being at least about 3% based on the weight of ungelatinized cereal starch.

9. Process of making a cold water-dispersible laundry starch which comprises adding borax to an aqueous slurry of ungelatinized wheat starch, spray drying the resulting slurry without gelatinizing said ungelatinized wheat starch, dry blending with the resulting dry material gelatinized potato starch, the pH of said resulting slurry being at least about 7, the amount of gelatinized potato starch being about 10%–30% based on the combined weight of gelatinized potato starch and ungelatinized wheat starch, the amount of borax being at least about 3% based on the weight of ungelatinized wheat starch.

10. Process of making a cold water-dispersible laundry starch which comprises adding a salt of boric acid to an aqueous slurry of ungelatinized cereal starch, drying the resulting slurry without gelatinizing said ungelatinized cereal starch, dry blending with the resulting dry material a water-soluble hydrophilic colloid, and incorporating laundry sours into the resulting mixture, the pH of said resulting slurry being at least about 7, the amount of hydrophilic colloid being about 3%–30% based on the combined weight of hydrophilic colloid and ungelatinized cereal starch, the amount of said salt of boric acid being at least about 3% based on the weight of ungelatinized cereal starch.

11. A cold water-dispersible laundry starch consisting essentially of an ungelatinized cereal starch and a salt of boric acid rapidly dried from a mixture of said ungelatinized cereal starch and an inert liquid diluent containing said salt, and a water-soluble hydrophilic colloid, the pH of said mixture being at least about 7, the amount of hydrophilic colloid being about 3%–30% based on the combined weight of hydrophilic colloid and ungelatinized cereal starch, the amount of said salt of boric acid being at least about 3% based on the weight of ungelatinized cereal starch.

12. A cold water-dispersible laundry starch consisting essentially of an ungelatinized wheat starch and borax rapidly dried from a slurry of said ungelatinized wheat starch containing borax, and gelatinized potato starch, the pH of said slurry being at least about 7, the amount of gelatinized potato starch being about 10%–30% based on the combined weight of the gelatinized potato starch and ungelatinized wheat starch, the amount of borax being at least about 3% based on the weight of ungelatinized wheat starch.

13. A cold water-dispersible laundry starch consisting essentially of an ungelatinized wheat starch and borax rapidly dried from an aqueous slurry of said ungelatinized wheat starch containing borax, and carboxyalkyl cellulose, the pH of said slurry being at least about 7, the amount of carboxyalkyl cellulose being about 3%–10% based on the combined weight of carboxyalkyl cellulose and ungelatinized wheat starch, the amount of borax being at least about 3% based on the weight of ungelatinized wheat starch.

14. A cold water-dispersible laundry starch consisting essentially of an ungelatinized wheat starch and borax rapidly dried from an aqueous slurry of said ungelatinized wheat starch containing borax, and carboxymethylcellulose, the pH of said slurry being at least about 7, the amount of carboxymethylcellulose being about 3%–10% based on the combined weight of carboxymethylcellulose and ungelatinized wheat starch, the amount of borax being at least about 3% based on the weight of ungelatinized wheat starch.

15. A cold water-dispersible laundry starch consisting essentially of an ungelatinized wheat starch and borax rapidly dried from an aqueous slurry of said ungelatinized wheat starch containing borax, and hydroxyalkyl starch, the pH of said slurry being at least about 7, the amount of hydroxyalkyl starch being about 3%–30% based on the combined weight of hydroxyalkyl starch and ungelatinized wheat starch, the amount of borax being at least about 3% based on the weight of ungelatinized wheat starch.

16. A cold water-dispersible laundry starch consisting essentially of an ungelatinized wheat starch and borax rapidly dried from an aqueous slurry of said ungelatinized wheat starch containing borax, and hydroxypropyl starch, the pH of said slurry being at least about 7, the amount of hydroxypropyl starch being about 3%–30% based on the combined weight of hydroxypropyl starch and ungelatinized wheat starch, the amount of borax being at least about 3% based on the weight of ungelatinized wheat starch.

17. A cold water-dispersible laundry starch consisting essentially of an ungelatinized wheat starch and borax rapidly dried from an aqueous slurry of said ungelatinized wheat starch containing borax, and hydroxyethyl starch, the pH of said slurry being at least about 7, the amount of hydroxyethyl starch being about 3%–30% based on the combined weight of hydroxyethyl starch and ungelatinized wheat starch, the amount of borax being at least about 3% based on the weight of ungelatinized wheat starch.

18. A cold water-dispersible laundry starch consisting essentially of an ungelatinized cereal starch and a salt of boric acid rapidly dried from an aqueous slurry of said ungelatinized cereal starch containing said salt, a water-soluble hydrophilic colloid, and laundry sours, the pH of said slurry being at least about 7, the amount of hydrophilic colloid being about 3%–30% based on the combined weight of hydrophilic coloid and ungelatinized cereal starch, the amount of said salt of boric acid being at least about 3% based on the weight of ungelatinized cereal starch.

References Cited in the file of this patent

UNITED STATES PATENTS

| | | |
|---|---|---|
| 1,501,911 | Mathias | July 22, 1924 |
| 1,968,722 | Stone | July 31, 1934 |
| 2,212,557 | Bauer | Aug. 27, 1940 |
| 2,764,568 | Hawkins | Sept. 25, 1956 |
| 2,811,462 | Cramer et al. | Oct. 29, 1957 |
| 2,819,980 | McCombs et al. | Jan. 4, 1958 |
| 2,868,664 | Goldstein | Jan. 13, 1959 |
| 2,903,391 | Kerr | Sept. 8, 1959 |
| 2,938,809 | Katzbeck | May 31, 1960 |

FOREIGN PATENTS

| | | |
|---|---|---|
| 894,088 | France | Dec. 13, 1944 |